United States Patent
Mu

(10) Patent No.: US 12,132,575 B2
(45) Date of Patent: Oct. 29, 2024

(54) METHOD AND DEVICE FOR SENDING HARQ-ACK CODEBOOK AND METHOD AND DEVICE FOR RECEIVING HARQ-ACK CODEBOOK

(71) Applicant: BEIJING XIAOMI MOBILE SOFTWARE CO., LTD., Beijing (CN)

(72) Inventor: Qin Mu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 357 days.

(21) Appl. No.: 17/764,946

(22) PCT Filed: Sep. 29, 2019

(86) PCT No.: PCT/CN2019/109204
§ 371 (c)(1),
(2) Date: Mar. 29, 2022

(87) PCT Pub. No.: WO2021/056567
PCT Pub. Date: Apr. 1, 2021

(65) Prior Publication Data
US 2022/0368466 A1    Nov. 17, 2022

(51) Int. Cl.
*H04L 1/1812* (2023.01)
*H04L 5/00* (2006.01)

(52) U.S. Cl.
CPC .......... *H04L 1/1812* (2013.01); *H04L 5/0044* (2013.01); *H04L 5/0053* (2013.01)

(58) Field of Classification Search
CPC ... H04L 1/1812; H04L 5/0044; H04L 5/0053; H04L 1/1861; H04L 1/1614; H04L 1/1854; H04L 5/0055
See application file for complete search history.

(56) References Cited

U.S. PATENT DOCUMENTS

2020/0235759 A1* 7/2020 Ye .................. H03M 13/6356
2020/0295878 A1* 9/2020 Choi ................... H04W 28/04

FOREIGN PATENT DOCUMENTS

| CN | 109639398 A | 4/2019 |
| CN | 110086583 A | 8/2019 |
| CN | 110149172 A | 8/2019 |

OTHER PUBLICATIONS

International Search Report of PCT/CN2019/109204 dated Jun. 29, 2020 with English translation, (4p).
OPPO, "Remaining Issues on HARQ-ACK Transmission", 3GPP TSG RAN WG1 Meeting AH 1801, R1-1800493 Vancouver, Canada, Jan. 22-26, 2018, (3p).

(Continued)

*Primary Examiner* — Mandish K Randhawa
(74) *Attorney, Agent, or Firm* — Arch & Lake LLP

(57) ABSTRACT

A method and device for sending an HARQ-ACK codebook, and a method and device for receiving an HARQ-ACK codebook are provided. The sending method includes: a first device generating an HARQ-ACK codebook, the HARQ-ACK codebook including a first part and a second part, the first part including TB based HARQ-ACK information, the second part including CBG based HARQ-ACK information of n TBs, and the number of bits of the second part being determined in advance, n being a positive integer; and the first device sending the HARQ-ACK codebook to a second device.

17 Claims, 3 Drawing Sheets

---

A first device generates an HARQ-ACK codebook, the HARQ-ACK codebook comprising a first part and a second part, the first part comprising TB-level HARQ-ACK information, the second part comprising CBG-level HARQ-ACK information of n TBs, and the number of bits of the second part being predetermined, n being a positive integer — 201

The first device sends the HARQ-ACK codebook to a second device — 202

(56) References Cited

OTHER PUBLICATIONS

Ericsson, "On Design of CBG HARQ-ACK Feedback Schemes", 3GPP TSG RAN WG1 Meeting #90, R1-1714438, Aug. 25, 2017, (4p).
Huawei, "Feature Lead Summary of HARQ Enhancements for NR-U", 3GPP TSG RAN WG1 Meeting #96, R1-1903423, Mar. 1, 2019, (13p).

* cited by examiner

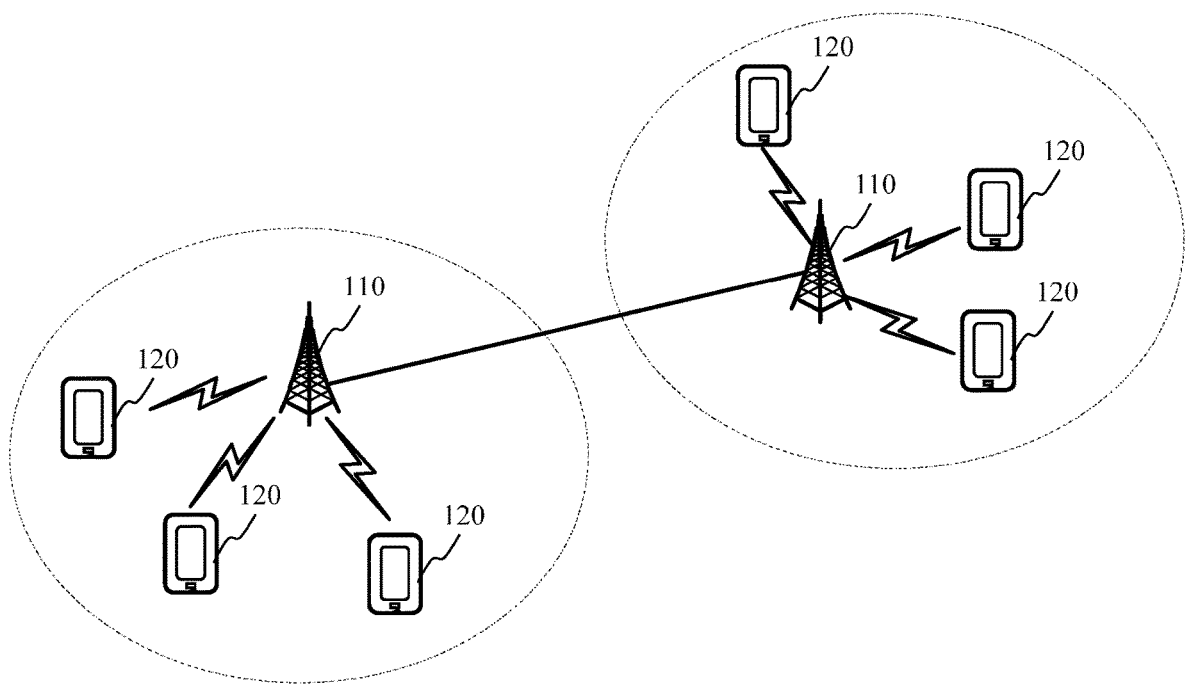

FIG. 1

201
A first device generates an HARQ-ACK codebook, the HARQ-ACK codebook comprising a first part and a second part, the first part comprising TB-level HARQ-ACK information, the second part comprising CBG-level HARQ-ACK information of n TBs, and the number of bits of the second part being predetermined, n being a positive integer 202
The first device sends the HARQ-ACK codebook to a second device

FIG. 2

A second device receives an HARQ-ACK codebook sent by a first device, where the HARQ-ACK codebook includes a first part and a second part, the first part includes TB based HARQ-ACK information, and the second part includes CBG based HARQ-ACK information of n TBs, the number of bits in the second part being determined in advance, n being a positive integer
FIG. 3
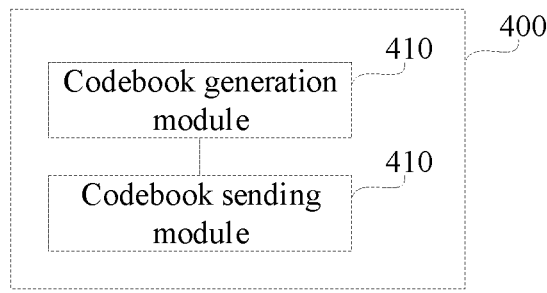
FIG. 4
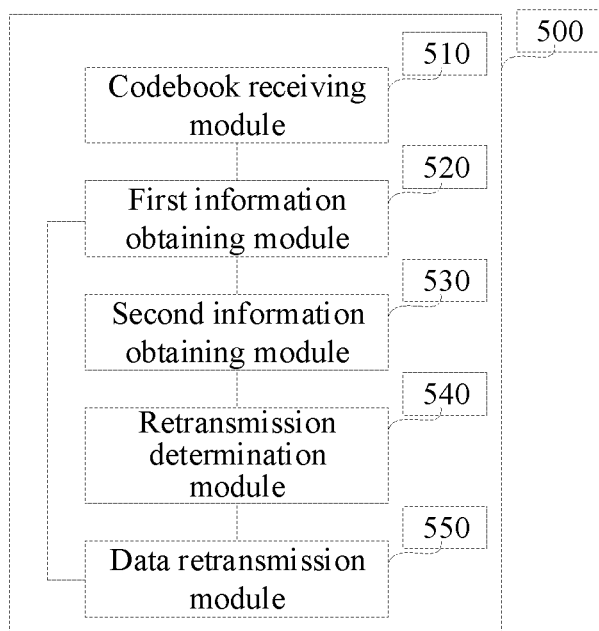
FIG. 5

METHOD AND DEVICE FOR SENDING HARQ-ACK CODEBOOK AND METHOD AND DEVICE FOR RECEIVING HARQ-ACK CODEBOOK

CROSS-REFERENCE TO RELATED APPLICATION

The present application is a U.S. National phase application of International Application No. PCT/CN2019/109204, filed on Sep. 29, 2019, the entire content of which is incorporated herein by reference for all purposes.

TECHNICAL FIELD

The present disclosure relates to the field of communication technology, and in particular to a method and device for sending a Hybrid Automatic Repeat reQuest-Acknowledge (HARQ-ACK) codebook, and a method and device for receiving a HARQ-ACK codebook.

BACKGROUND

At present, the HARQ-ACK codebook feedback modes mainly include Transport Block (TB) based feedback and Code Block Group (CBG) based feedback. The TB based feedback requires retransmission of the entire TB, resulting in high resource overhead when sending data. The CBG based feedback requires carrying in the HARQ-ACK codebook the HARQ-ACK information of each CBG in each TB, resulting in a large size of the HARQ-ACK codebook.

In the related art, a combination of TB based feedback and CBG based feedback is provided, i.e., the HARQ-ACK codebook includes the HARQ-ACK information corresponding to each TB, as well as the CBG based HARQ-ACK information of each TB whose feedback state is Non Acknowledge (NACK), which can reduce the size of the HARQ-ACK codebook and the resource overhead of retransmitting data. For example, if the HARQ-ACK information of 10 TBs is multiplexed into one HARQ-ACK codebook and each TB includes 8 CBGs, the HARQ-ACK codebook includes 10 bits of TB based HARQ-ACK information. Assuming that the number of TBs with feedback state of NACK among 10 TBs is 1, the HARQ-ACK codebook includes 8 bits of CBG based HARQ-ACK information in addition to the above 10 bits of TB based HARQ-ACK information, i.e., the total number of bits in the HARQ-ACK codebook is 18. Assuming that the number of TBs with feedback state of NACK among 10 TBs is 2, the HARQ-ACK codebook includes 16 bits of CBG based HARQ-ACK information in addition to the above 10 bits of TB based HARQ-ACK information, i.e., the total number of bits in the HARQ-ACK codebook is 26.

SUMMARY

The present disclosure provides a method and device for sending an HARQ-ACK codebook, and a method and device for receiving an HARQ-ACK codebook. The technical solution is as follows.

According to a first aspect of the present disclosure, there is provided a method for sending an HARQ-ACK codebook. The method includes: generating, by a first device, an HARQ-ACK codebook, where the HARQ-ACK codebook includes a first part and a second part, the first part includes TB based HARQ-ACK information, and the second part includes CBG based HARQ-ACK information of n TBs, the number of bits in the second part being determined in advance, n being a positive integer; and sending, by the first device, the HARQ-ACK codebook to a second device.

According to a second aspect of the present disclosure, there is provided a method for receiving an HARQ-ACK codebook. The method includes: receiving, by a second device, an HARQ-ACK codebook sent by a first device, where the HARQ-ACK codebook includes a first part and a second part, the first part includes TB based HARQ-ACK information, and the second part includes CBG based HARQ-ACK information of n TBs. The number of bits in the second part is determined in advance, and n is a positive integer.

According to a third aspect of the present disclosure, there is provided a device for sending an HARQ-ACK codebook, applied to a first device. The device includes a processor, and a memory for storing one or more executable instructions of the processor. The processor is configured to: generate an HARQ-ACK codebook, where the HARQ-ACK codebook includes a first part and a second part, the first part includes TB based HARQ-ACK information, and the second part includes CBG based HARQ-ACK information of n TBs, the number of bits in the second part being determined in advance, n being a positive integer; and send the HARQ-ACK codebook to a second device.

It should be understood that the above general description and the later detailed description are exemplary and explanatory only and do not limit the present disclosure.

BRIEF DESCRIPTION OF THE DRAWINGS

The accompanying drawings, which are incorporated in and constitute a part of this description, illustrate embodiments consistent with the disclosure, and are used in conjunction with the description to explain the principles of the disclosure.

FIG. 1 is a schematic diagram showing network architecture in accordance with an embodiment.

FIG. 2 is a flow chart showing a method for sending an HARQ-ACK codebook in accordance with an embodiment.

FIG. 3 is a flow chart showing a method of receiving an HARQ-ACK codebook in accordance with an embodiment.

FIG. 4 is a block diagram showing an apparatus for sending an HARQ-ACK codebook in accordance with an embodiment.

FIG. 5 is a block diagram showing an apparatus for receiving an HARQ-ACK codebook in accordance with an embodiment.

DETAILED DESCRIPTION

Figure 6:
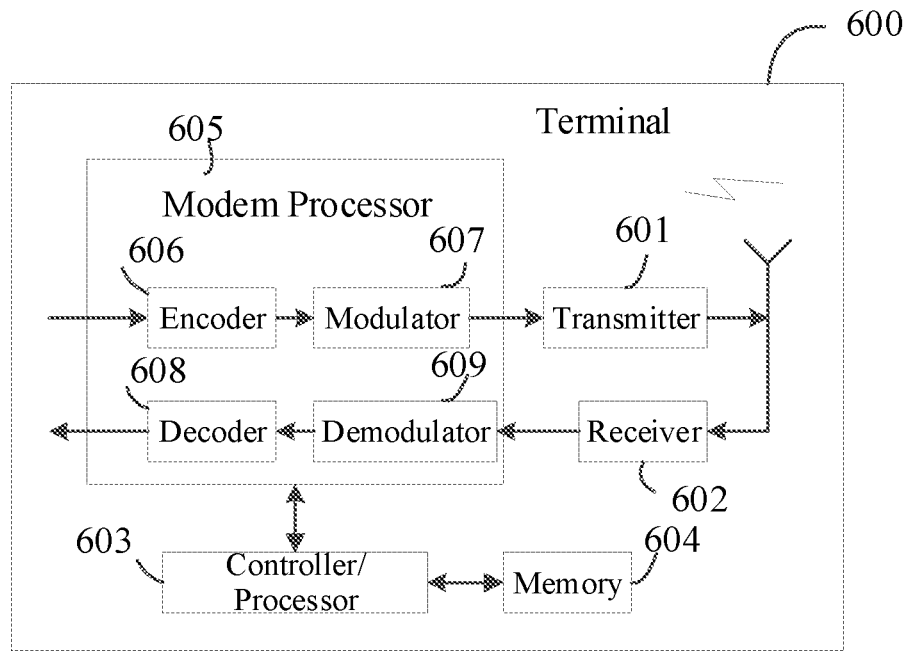
FIG. 6 is a structural block diagram showing a terminal in accordance with an embodiment.

Embodiments will be described here in detail, examples of which are illustrated in the accompanying drawings. When the following description relates to the drawings, the same numerals in different drawings refer to the same or similar elements unless otherwise indicated. The implementations described in the embodiments below are not intended to represent all implementations consistent with this disclosure. Rather, they are only examples of devices and methods consistent with some aspects of the present disclosure as recited in the appended claims.

The network architecture and the business scenarios described in the embodiments of this disclosure are intended to illustrate the technical solutions of the embodiments of this disclosure more clearly and do not constitute a limitation of the technical solutions provided by the embodiments of this disclosure. It is known to those of ordinary skill in the art that as network architectures evolve and new business scenarios emerge, the technical solutions provided by the embodiments of this disclosure are equally applicable to similar technical problems.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a schematic diagram showing network architecture in accordance with an embodiment. The network architecture may include base stations 110 and terminals 120.

The base station 110 is deployed in the access network. The access network in 5G New Radio (NR) system can be called New Generation-Radio Access Network (NG-RAN). The base station 110 and the terminal 120 communicate with each other via certain air interface technology, e.g., a cellular technology.

The base station 110 is a device deployed in the access network, configured to provide wireless communication functions to the terminal 120. The base station 110 may include various forms of macro base stations, micro base stations, relay stations, access points, and the like. In systems using different wireless access technologies, the name of the devices having the base station functions may vary. For example, in a 5G NR system, the device having the base station function is called gNodeB or gNB. The term "base station" may change as communication technologies evolve. For convenience of description, in the embodiments of the present disclosure, the above-mentioned devices that provide wireless communication functions for the terminal 120 are collectively referred to as base stations.

There are typically multiple terminals 120, and one or more terminals 120 may be distributed within the cell area managed by each base station 110. The terminals 120 may include various handheld devices with wireless communication capabilities, vehicle-mounted devices, wearable devices, computing devices or other processing devices connected to a wireless modem, and various forms of User Equipment (UE), Mobile Station (MS), terminal device, etc. For convenience of description, in the embodiments of the present disclosure, the previously mentioned devices are collectively referred to as terminals.

The term "5G NR system" in embodiments of the present disclosure may also be referred to as a 5G system or NR system, which will be understood by those of skill in the art. The technical solutions described in embodiments of the present disclosure may be applicable to 5G NR systems, and may also be applicable to subsequent evolved systems of 5G NR systems.

In the 5G NR system, for each unicast downlink data, Physical Downlink Shared Channel (PDSCH), sent from the base station to the terminal, each PDSCH corresponds to 1 TB in the case that no space division multiplexing is used, or each PDSCH corresponds to 2 TBs in the case of using the space division multiplexing. If the space feedback bundling mode is not used, the terminal may feed back HARQ-ACK information to the base station for each TB. One piece of HARQ-ACK information includes an ACK state or NACK state, where the ACK state indicates that the terminal demodulated the TB correctly, and the NACK state indicates that the terminal demodulated the TB incorrectly. The base station determines whether to retransmit the TB that is in error using the received HARQ-ACK information.

Each TB contains N CBGs, and the value of N is configured by the base station for the terminal, e.g., N=2/4/6/8. Each CBG contains one or more Code Blocks (CBs), and the number of CBs contained in each CBG is calculated by the total number of CBs contained in the TB and the above-mentioned N value based on the relevant protocol conventions. It can be understood that a CB is a sequence of bits, a CBG is a bunch of bits containing one or more CBs, and a TB is a bunch of bits containing multiple CBGs.

In the related NR protocol, CB is the smallest unit of data demodulation. For example, a TB contains 8 CBs, and the terminal will demodulate each of the 8 CBs (e.g., CB0-CB7) when receiving and demodulating this TB. Assuming that CB0 is demodulated incorrectly and CB1-CB7 are demodulated correctly, the overall result for this TB is still demodulation error in this case. Thus, the terminal feeds back a NACK for this TB, and the base station retransmits the entire TB after receiving the NACK.

The HARQ-ACK feedback mode described above is called TB based feedback, in which 1 bit of HARQ-ACK information is fed back for each TB. However, the main disadvantage of the TB based feedback is that the entire TB needs to be retransmitted if an error occurs and the resource overhead of retransmission is large. Thus, a CBG based retransmission method has been introduced to the related NR protocol, i.e., 1 bit of HARQ-ACK information is fed back for each CBG, and the retransmission is performed according to the CBG unit. Following the example above, assuming that the number of CBGs in a TB is N=4, every 2 consecutive CBs form a CBG, and 1 bit of HARQ-ACK information is fed back for each CBG. Thus, for one TB, the terminal feeds back a total of 4 bits of HARQ-ACK information, e.g., "0111", in this case, "0" indicates NACK and "1" indicates ACK. Once the base station receives the 4-bit feedback, it knows that CBG1 containing CB0 and CB1 is not demodulated correctly and CBG1 needs to be retransmitted, while the CBG2, CBG3, or CBG4 will not be retransmitted by the base station. Thus, the CBG based feedback can reduce the resource overhead when retransmitting data.

In the actual NR system, the HARQ-ACK information of multiple TBs will be multiplexed to form a single HARQ-ACK codebook. For example, the HARQ-ACK information of 7 TBs is multiplexed to form one HARQ-ACK codebook. If the TB based feedback is used, the size of the HARQ-ACK codebook is 7 bits, and 1 bit corresponds to one TB. If the CBG based feedback is used, assuming that each TB contains 4 CBGs, the size of the HARQ-ACK codebook is 7×4=28 bits.

It can be seen from above embodiments that one problem with CBG based feedback is the large size of the HARQ-ACK codebook. If an HARQ-ACK codebook contains the HARQ-ACK feedback of M TBs, and the TB based feedback is used, M bits are required, but if the CBG based feedback is used, M×N bits are required.

In order to reduce the size of the HARQ-ACK codebook, the related technical solution proposes to divide a HARQ-ACK feedback into TB based feedback and CBG based feedback, and the TB based feedback that is NACK will be accompanied with its CBG based feedback, while for the TB based feedback that is ACK will not be accompanied with its CBG based feedback, which reduces the size of the HARQ-ACK codebook. For example, assuming that in a non-space division multiplexing scenario, one TB contains 8 CBGs, and a certain HARQ-ACK codebook contains feedback for 10 PDSCHs, the base station can determine the number of bits of the TB based feedback without demodulating the HARQ-ACK codebook, but the base station cannot determine the number of bits of the CBG based feedback. This is because the CBG based feedback is provided for the TB based feedback that is NACK. If there is NACK fed back for one among 10 TBs, the number of bits of the CBG feedback is 8 bits, and the total number of bits in the HARQ-ACK codebook is 18. If there are NACKs fed back for two among 10 TBs, the number of bits of the CBG based feedback is 16 bits, and the total number of bits in the HARQ-ACK codebook is 26. That is, the total number of bits in the HARQ-ACK codebook depends on the actual situation of PDSCH demodulation at the terminal, which cannot be known in advance by the base station. The base station cannot be known the number of bits included in the HARQ-ACK codebook in advance, which will result in the base station not being able to effectively demodulate or even fail to demodulate the HARQ-ACK information.

In the technical solutions provided by the present disclosure, the terminal can transmit the HARQ-ACK information with the HARQ-ACK codebook size known in advance by the base station, thus ensuring that the base station can accurately demodulate the HARQ-ACK information and improve the data transmission performance between the terminal and the base station.

In addition, the HARQ-ACK codebook feedback includes a semi-static codebook feedback mode and a dynamic codebook feedback mode. The semi-static and dynamic codebook feedback modes are introduced and explained by taking downlink transmission as an example.

The semi-static codebook feedback mode refers to feeding back HARQ-ACK information for all valid positions (regardless of whether a PDSCH transmission actually occurred or not) within a feedback window that are configured at a high level and can be used for PDSCH transmission. In this way, the miss detection of PDSCH that affects the size of the HARQ-ACK codebook size can be prevented because the number of bits in the HARQ-ACK codebook depends on the number of valid positions within the feedback window that are configured at the high level for the transmission of PDSCHs. For a valid position within the feedback window where no PDSCH is actually sent, or where the terminal has missed the detection of PDSCH (but in fact the terminal cannot actually know whether the miss detection has occurred, the terminal only knows that no PDSCH has been received at this valid position), the terminal will feed back a NACK.

The dynamic codebook feedback mode refers to the base station using a counter to accumulate the PDSCHs actually sent and sending the counter value to the terminal together with the Downlink Control Information (DCI) or PDSCH. The terminal will check the counter value in the DCI corresponding to each received PDSCH to determine whether a miss detection of PDSCH has occurred. The terminal performs HARQ-ACK feedback for the actually sent PDSCH. The number of bits in the HARQ-ACK code book depends on the number of PDSCHs actually sent by the base station. For a missed PDSCH, the terminal will feed back a NACK.

The above description introduces the semi-static codebook feedback mode and dynamic codebook feedback mode by taking the downlink transmission as an example. For the uplink transmission, the base station may also adopt the semi-static codebook feedback mode or dynamic codebook feedback mode when providing HARQ-ACK feedback to the terminal. Alternatively, for other transmission scenarios, the receiving device may also adopt the semi-static codebook feedback mode or dynamic codebook feedback mode when providing HARQ-ACK feedback to the sending device, which is not limited by the embodiments of this disclosure.

The technical solutions of the present disclosure will be described in detail below through some method embodiments.

FIG. 2 is a flow chart showing a method for sending an HARQ-ACK codebook in accordance with an embodiment. The method may be applied in the network architecture shown in FIG. 1. The method may include several steps (steps 201-202) as follows.

At step 201, a first device generates an HARQ-ACK codebook, where the HARQ-ACK codebook includes a first part and a second part, the first part including TB based HARQ-ACK information, and the second part including CBG based HARQ-ACK information of n TBs. The number of bits in the second part is determined in advance, and n is a positive integer.

At step 202, the first device sends the HARQ-ACK codebook to the second device.

In the embodiments of the present disclosure, the first device refers to a receiving device and the second device refers to a sending device. The sending device sends data to the receiving device, and the receiving device feeds back HARQ-ACK information to the sending device based on the reception of the data. In the downlink transmission scenario, for example, the first device is the terminal and the second device is the base station, the base station sends downlink data (i.e., PDSCH) to the terminal, and the terminal feeds back HARQ-ACK information to the base station based on the reception of PDSCH. In the uplink transmission scenario, for example, the first device is the base station and the second device is the terminal, the terminal sends uplink data (i.e., Physical Uplink Shared Channel (PUSCH)) to the base station, and the base station feeds back HARQ-ACK information to the terminal based on the reception of PUSCH.

In the embodiments of the present disclosure, the HARQ-ACK codebook includes the first part and the second part, the first part including TB based HARQ-ACK information, and the second part including CBG based HARQ-ACK information of n TBs. Here, the first part may include m pieces of TB based HARQ-ACK information, that is, the m pieces of TB based HARQ-ACK information are multiplexed to the same HARQ-ACK codebook, and m is a positive integer. The second part may include CBG based HARQ-ACK information of n TBs, and the value of n is less than m. Exemplarily, taking the downlink transmission scenario as an example, the base station schedules the HARQ-ACK information corresponding to 15 PDSCHs to be multiplexed into one HARQ-ACK codebook, each PDSCH corresponding to 1 TB, and thus the first part of the HARQ-ACK codebook includes the HARQ-ACK information corresponding to 15 TBs, and the second part may include the CBG based HARQ-ACK information of n TBs, and the value of n in this example may be 1, 2, 3, etc., and n is less than 15.

In the semi-static codebook feedback mode, one HARQ-ACK codebook corresponds to one feedback window. Assuming that the number of valid positions configured in the feedback window is m, and each valid position can be used to transmit 1 TB (but in practice, a TB may or may not be transmitted at a valid position), the first part of the HARQ-ACK codebook includes m pieces of TB based HARQ-ACK information, and each piece of TB based HARQ-ACK information corresponds to HARQ-ACK feedback at a valid position. For example, a feedback window contains 16 valid positions for PDSCH, and assuming that TB transmissions are performed at 10 of these 16 valid positions and no TB transmission is performed at the other 6 valid positions, the first part of the HARQ-ACK codebook still includes 16 pieces of TB based HARQ-ACK information, each of which corresponds to HARQ-ACK feedback at a valid position, that is, for any valid position, TB based HARQ-ACK feedback is required regardless of whether TB transmission is actually performed or not.

In the dynamic codebook feedback mode, the first device will perform HARQ-ACK feedback on the TBs actually sent by the second device, i.e., the m pieces of TB based HARQ-ACK information included in the first part of the HARQ-ACK codebook correspond to m TBs, and the m TBs are actually sent by the second device.

In the embodiments of the present disclosure, the number of bits of the second part of the HARQ-ACK codebook is determined in advance, i.e., determinable before demodulating the HARQ-ACK codebook. Since the number of bits in the second part is determined in advance, the number of bits in the second part is known in advance by the second device, i.e., the second device may determine the number of bits in the second part of the HARQ-ACK codebook in advance before demodulating the HARQ-ACK codebook, and thus the number of bits in the HARQ-ACK codebook may be determined in advance. Since the first part of the HARQ-ACK codebook includes TB based HARQ-ACK information, and the amount of TB based HARQ-ACK information to be fed back in the HARQ-ACK codebook is known in advance by the second device, the number of bits in the first part of the HARQ-ACK codebook is known in advance, and when the number of bits in the first part of the HARQ-ACK codebook and the number of bits in the second part of the HARQ-ACK codebook are both known in advance, then the number of bits in the entire HARQ-ACK codebook is known in advance.

In one embodiment, in order for the second device to know the number of bits in the second part of the HARQ-ACK codebook in advance, the number of bits in the second part is determined based on a parameter pre-configured by the second device or by the first device. Moreover, the pre-configured parameter will be synchronized between the first device and the second device. For example, the pre-configured parameter may be the value of the number of bits in the second part, may be the number of TBs in the second part that perform CBG based feedback (i.e., the value of n described above), or may be a proportionality coefficient that is the ratio of the number of TBs in the second part that perform CBG based feedback to the number of TB based HARQ-ACK information for multiplexing HARQ-ACK codebook, which is not limited by the embodiments of the present disclosure.

For example, the pre-configured parameter may be that the number of bits in the second part is 4, it may also be that the number of TBs in the second part that perform CBG based feedback is 1, i.e., pre-configured with a value of 1 for n as described above, or it may be a proportionality coefficient, e.g., 10%, according to which the first device can determine the number of TBs in the second part that perform CBG based feedback.

In another embodiment, in order for the second device to know the number of bits in the second part of the HARQ-ACK codebook in advance, the number of bits in the second part is pre-determined, i.e., the number of bits in the second part is pre-determined by the communication protocol. For example, the value of the number of bits in the second part may be pre-determined in the communication protocol, the number of TBs of the second part that perform CBG based feedback (i.e., the value of n as described above) may be pre-determined in the communication protocol, or a proportionality coefficient may be pre-determined in the communication protocol that is the ratio of the number of TBs in the second part that perform CBG based feedback to the amount of the TB based HARQ-ACK information for multiplexing HARQ-ACK codebook, which is not limited by the embodiments of the present disclosure.

For example, the number of bits in the second part may be pre-determined in the communication protocol as 8, the number of TBs in the second part that perform CBG based feedback may be pre-determined in the communication protocol as 2, i.e., the value of n as described above may be pre-determined as 2, or a proportionality coefficient, such as 8%, may be pre-determined in the communication protocol, according to which the first device can determine the number of TBs in the second part that perform CBG based feedback.

In some embodiments, n is an upward rounding of a product of a preset coefficient and the number of TBs. Alternatively, n is a downward rounding of the product of the preset coefficient and the number of TBs. Here, the number of TBs is an amount of TB based HARQ-ACK information for multiplexing HARQ-ACK codebook, i.e., m as introduced above. Optionally, the preset coefficient is pre-configured by the second device or by the first device, or the preset coefficient may also be pre-determined by the communication protocol, which is the proportionality coefficient as introduced above. Optionally, the preset coefficient is a constant greater than 0 and less than 1 and may be set according to the error rate of the data transmission process. For example, the general PDSCH or PUCCH transmission process generally requires an error rate of less than 10%, and thus, the preset coefficient may be set to a value less than or equal to 10%, or to a value of about 10%, e.g., 10%.

In an example, the number of bits s of the HARQ-ACK codebook may be calculated as follows.

$$s=a+\lceil \lambda \times m \rceil \times b. \quad \text{(Equation 1)}.$$

Here, "a" represents the number of bits in the first part, i.e., the number of bits in the above-mentioned m pieces of TB based HARQ-ACK information, "λ" represents the preset coefficient, "m" represents the amount of the TB based HARQ-ACK information of the first part, "b" represents the number of CBGs contained in a TB, e.g., the value of b may be 2, 4, 6, or 8, etc., and "⌈ ⌉" represents the upward rounding symbol. In this case, n=⌈λ×m⌉.

In another example, the number of bits s of the HARQ-ACK codebook may be calculated as follows.

$$s=a+\lfloor \lambda \times m \rfloor \times b. \quad \text{(Equation 2)}.$$

Here, "a" represents the number of bits in the first part, i.e., the number of bits of the above-mentioned m pieces of TB based HARQ-ACK information, "λ" represents the preset coefficient, "m" represents the amount of the TB based HARQ-ACK information of the first part, "b" represents the number of CBGs contained in a TB, e.g., the value of b may be 2, 4, 6, or 8, etc., and "⌊ ⌋" represents the downward rounding symbol. In this case, n=⌊λ×m⌋.

In addition, when calculating the number of bits of the HARQ-ACK codebook, whether upward or downward rounding is used may be pre-determined in the communication protocol, or may be pre-configured by the first or second device, and then synchronized between the first device and the second device, which is not limited by the embodiments of this disclosure.

Alternatively, if the above parameters are pre-configured by the second device, the second device may send pre-configuration information to the first device, which is used to indicate the parameters pre-configured by the second device. For example, the pre-configuration information may include the value of the number of bits in the second part, or may include the number of TBs in the second part that perform CBG based feedback (i.e., the value of n as described above), or may include the proportionality coefficient as described above, which is not limited by the embodiments of the present disclosure. Optionally, if the first device is a terminal and the second device is a base station, the base station may send the pre-configuration information to the terminal via high-level signaling, e.g., the base station sends the pre-configuration information to the terminal via Radio Resource Control (RRC) signaling. For downlink transmission, the terminal generates an HARQ-ACK codebook based on the pre-configuration information and sends it to the base station, and then the base station demodulates the HARQ-ACK codebook according to the pre-configuration information.

If the above parameters are pre-configured by the first device, the first device may send pre-configuration information to the second device, which is used to indicate the parameters pre-configured by the first device. For example, the pre-configuration information may include the value of the number of bits in the second part, or may include the number of TBs in the second part that perform CBG based feedback (i.e., the value of n as described above), or may include the proportionality coefficient as described above, which is not limited by the embodiments of the present disclosure. Optionally, if the first device is a base station and the second device is a terminal, the base station may send the pre-configuration information to the terminal via high-level signaling, e.g., the base station sends the pre-configuration information to the terminal via RRC signaling. For uplink transmission, the base station generates an HARQ-ACK codebook based on the pre-configuration information and sends it to the terminal, and then the terminal demodulates the HARQ-ACK codebook according to the pre-configuration information.

In some embodiments, the HARQ-ACK information corresponding to each TB is 1 bit, and the feedback state indicated by the HARQ-ACK information corresponding to each TB is either an acknowledgment of receipt (ACK) or a negative acknowledgment of receipt (NACK). For example, the HARQ-ACK information being "1" indicates ACK and the HARQ-ACK information being "0" indicates NACK, or, the HARQ-ACK information being "0" indicates ACK and the HARQ-ACK information being "1" indicates NACK. A TB with a feedback state of ACK refers to a successfully received TB, i.e., a received and successfully demodulated TB. A TB with a feedback state of NACK refers to an unsuccessfully received TB, including the following two cases: 1) TB received but demodulated incorrectly; 2) TB not received. For the TB not received, there may be two cases: 1) the second device sent the TB but the first device missed the detection of the TB; 2) the second device did not send the TB, so the first device did not receive the TB.

For a TB with a feedback state of NACK as indicated by the HARQ-ACK information, the second part of the HARQ-ACK codebook may contain CBG based HARQ-ACK information of the TB. It should be noted that in the technical solutions provided by the present disclosure, in order for the second device to know the number of bits in the second part in advance, the CBG based HARQ-ACK information may not be available for every TB with a feedback state of NACK. The CBG based HARQ-ACK information of which TB or TBs is determined by the terminal based on the number of TBs in the second part that performed CBG based feedback (i.e., the value of n as described above) and the TB(s) that was/were not received successfully.

In an example, it is assumed that the first part includes m pieces of TB based HARQ-ACK information, and m is a positive integer. When the number of unsuccessfully received TBs corresponding to the m pieces of TB based HARQ-ACK information is k and k is less than or equal to n, the second part includes the CBG based HARQ-ACK information of k unsuccessfully received TBs. In addition, if k is less than n, the position in the second part that is not occupied by the CBG based HARQ-ACK information of the k unsuccessfully received TBs is supplemented by a preset value, which may be "1" or "0", without any limitation in this embodiment of the present disclosure. When the number of unsuccessfully received TBs corresponding to the m pieces of TB based HARQ-ACK information is k and k is greater than n, the second part includes the CBG based HARQ-ACK information of the first n unsuccessfully received TBs selected from the k unsuccessfully received TBs.

Taking the dynamic codebook feedback mode as an example, the base station schedules 15 PDSCHs, and the HARQ-ACK information corresponding to these 15 PDSCHs is multiplexed into an HARQ-ACK codebook, and each PDSCH corresponds to 1 TB. The base station configures λ=10% and the number of CBGs contained in each TB being 4, i.e., b=4, for the terminal via high-level signaling (e.g., RRC signaling). Each TB corresponds to 1 bit of HARQ-ACK information, where the HARQ-ACK information being "1" indicates ACK, and the HARQ-ACK information being "0" indicates NACK. The base station calculates the number of bits of HARQ-ACK codebook according to Equation (2), i.e., s=15×1+⌊10%×15⌋×4=19, where the first 15 bits are the TB based HARQ-ACK information corresponding to 15 TBs, and the last 4 bits are the CBG based HARQ-ACK information for a particular TB, i.e., 1 TB can perform CBG based HARQ-ACK feedback.

In an example, it is assumed that for the above 15 TBs, the results of terminal demodulation are shown in Table 1 below.

TABLE 1

| TB1 | TB2 | TB3 | TB4 | TB5 | TB6 | TB7 | TB8 | TB9 | TB10 | TB11 | TB12 | TB13 | TB14 | TB15 |
|---|---|---|---|---|---|---|---|---|---|---|---|---|---|---|
| ACK | ACK | NACK | ACK | ACK | ACK | ACK | ACK | ACK | ACK | ACK | ACK | ACK | NACK | ACK |

As can be seen from Table 1 above, there are 2 TBs (i.e., TB3 and TB14) with the demodulation result of NACK. Since there is 1 TB configured by the base station for CBG based feedback, the terminal can feed back the CBG based HARQ-ACK information for the first TB (i.e., TB3) with the demodulation result of NACK, while no CBG based HARQ-ACK information is fed back for TB14. If among the 4 CBGs (CBG0-CBG3) contained in TB3, CBG2 is demodulated incorrectly and the other CBGs are demodulated correctly, then the HARQ-ACK codebook fed back by the terminal is shown in Table 2 below.

TABLE 2

| First part | | | | | | | | | | | | | | | Second part CBG based feedback |
|---|---|---|---|---|---|---|---|---|---|---|---|---|---|---|---|
| TB1 | TB2 | TB3 | TB4 | TB5 | TB6 | TB7 | TB8 | TB9 | TB10 | TB11 | TB12 | TB13 | TB14 | TB15 | |
| 1 | 1 | 0 | 1 | 1 | 1 | 1 | 1 | 1 | 1 | 1 | 1 | 1 | 0 | 1 | 1101 |

In another example, it is assumed that for the above 15 TBs, the results of terminal demodulation are shown in Table 3 below.

TABLE 3

| TB1 | TB2 | TB3 | TB4 | TB5 | TB6 | TB7 | TB8 | TB9 | TB10 | TB11 | TB12 | TB13 | TB14 | TB15 |
|---|---|---|---|---|---|---|---|---|---|---|---|---|---|---|
| ACK | ACK | ACK | ACK | ACK | ACK | ACK | ACK | ACK | ACK | ACK | ACK | ACK | ACK | ACK |

As can be seen from Table 3 above, the demodulation results of all TBs are ACK. Since there is 1 TB configured by the base station for CBG based feedback, the terminal may set all 4 bits of the CBG based feedback bit to "1". Accordingly, the HARQ-ACK codebook fed back by the terminal is shown in Table 4 below.

TABLE 4

| First part | | | | | | | | | | | | | | | Second part CBG based feedback |
|---|---|---|---|---|---|---|---|---|---|---|---|---|---|---|---|
| TB1 | TB2 | TB3 | TB4 | TB5 | TB6 | TB7 | TB8 | TB9 | TB10 | TB11 | TB12 | TB13 | TB14 | TB15 | |
| 1 | 1 | 1 | 1 | 1 | 1 | 1 | 1 | 1 | 1 | 1 | 1 | 1 | 1 | 1 | 1111 |

In yet another example, if the base station calculates the number of bits of the HARQ-ACK codebook according to Equation (1), i.e., $s = 15 \times 1 + \lceil 10\% \times 15 \rceil \times 4 = 23$, the first 15 bits are the TB based HARQ-ACK information corresponding to 15 TBs, and the last 8 bits are the CBG based HARQ-ACK information for two TBs, i.e., 2 TBs can perform CBG based HARQ-ACK feedback.

It is assumed that for the above 15 TBs, the results of terminal demodulation are shown in Table 5 below.

TABLE 5

| TB1 | TB2 | TB3 | TB4 | TB5 | TB6 | TB7 | TB8 | TB9 | TB10 | TB11 | TB12 | TB13 | TB14 | TB15 |
|---|---|---|---|---|---|---|---|---|---|---|---|---|---|---|
| ACK | ACK | NACK | ACK | ACK | ACK | ACK | ACK | ACK | ACK | ACK | ACK | ACK | ACK | ACK |

As can be seen from Table 5 above, there is 1 TB (i.e., TB3) with the demodulation result of NACK. Since there are two TBs configured by the base station for CBG based feedback, the terminal feeds back the CBG based HARQ-ACK information (which occupies 4 bits) of TB3 in the second part, and sets all of the remaining 4 bits to "1". It is assumed that among 4 CBGs (CBG0-CBG3) contained in TB3, CBG2 is demodulated incorrectly and the other CBGs are demodulated correctly, and the HARQ-ACK codebook fed by the terminal is shown in Table 6 below.

TABLE 6

| First part | | | | | | | | | | | | | | | Second part CBG based feedback |
|---|---|---|---|---|---|---|---|---|---|---|---|---|---|---|---|
| TB1 | TB2 | TB3 | TB4 | TB5 | TB6 | TB7 | TB8 | TB9 | TB10 | TB11 | TB12 | TB13 | TB14 | TB15 | |
| 1 | 1 | 0 | 1 | 1 | 1 | 1 | 1 | 1 | 1 | 1 | 1 | 1 | 1 | 1 | 1101 1111 |

Taking the semi-static codebook feedback mode as an example, the base station configures a feedback window with 16 valid PDSCH positions, which can be interpreted as corresponding to 16 pieces of TB based HARQ-ACK information. The base station configures $\lambda=10\%$ and the number of CBGs contained in each TB being 4, i.e., b=4, for the terminal via high-level signaling (e.g., RRC signaling). Each TB corresponds to 1 bit of HARQ-ACK information, where the HARQ-ACK information being "1" indicates ACK, and the HARQ-ACK information being "0" indicates NACK. The number of TBs requiring CBG based feedback in a semi-static codebook is $n=\lfloor \lambda \times m \rfloor = \lfloor 10\% \times 16 \rfloor = 1$. It is assumed that the base station actually schedules 10 PDSCHs among the 16 PDSCH valid positions. Then, the terminal will feed back NACK for all the PDSCHs that are not scheduled, and for the 10 PDSCHs that are actually scheduled, the terminal will provide feedback according to the actual demodulation. It is assumed that the TB based feedback determined by the terminal is as shown in Table 7 below.

TABLE 7

| TB1 | TB2 | TB3 | TB4 | TB5 | TB6 | TB7 | TB8 | TB9 | TB10 | TB11 | TB12 | TB13 | TB14 | TB15 | TB16 |
|---|---|---|---|---|---|---|---|---|---|---|---|---|---|---|---|
| NACK | NACK | NACK | NACK | NACK | NACK | ACK | ACK | ACK | ACK | NACK | ACK | ACK | ACK | ACK | ACK |

In this case, TB1-TB6 are not actually sent by the base station (but the terminal cannot distinguish whether the base station actually sends them), so the terminal feeds back NACK for TB1-TB6. TB7-TB16 are the data actually sent by the base station, where TB11 is demodulated incorrectly (e.g., CBG1 is demodulated incorrectly and other CBGs are demodulated correctly) and other TBs are demodulated correctly, then the terminal feeds back NACK for TB11, and feeds back ACK for TB7-TB10 and TB12-TB16. Among 7 TBs with feedback state of NACK, i.e., TB1-TB6 and TB11, the terminal selects the first TB with the feedback state of NACK for CBG based feedback, i.e., TB1. Correspondingly, the HARQ-ACK codebook fed back by the terminal is shown in Table 8 below.

TABLE 8

| | | | | | | First part | | | | | | | | | | Second part CBG based feedback |
|---|---|---|---|---|---|---|---|---|---|---|---|---|---|---|---|---|
| TB1 | TB2 | TB3 | TB4 | TB5 | TB6 | TB7 | TB8 | TB9 | TB10 | TB11 | TB12 | TB13 | TB14 | TB15 | TB16 | |
| 0 | 0 | 0 | 0 | 0 | 0 | 1 | 1 | 1 | 1 | 0 | 1 | 1 | 1 | 1 | 1 | 0000 |

In some embodiments, each TB corresponds to 2 bits of HARQ-ACK information, such that the feedback states indicated by the HARQ-ACK information corresponding to each TB may include at most 4 types. Optionally, the feedback state indicated by the HARQ-ACK information corresponding to each TB is any one of the following.

(1) Acknowledgement of receipt (ACK).
(2) Negative acknowledgement of receipt (NACK) and presence of the CBG based HARQ-ACK information.
(3) Negative acknowledgement of receipt (NACK) and absence of the CBG based HARQ-ACK information.
(4) No data received.

For a TB, when its corresponding feedback state is "acknowledgement of receipt (ACK)", it means that the TB is received and demodulated successfully; when its corresponding feedback state is "negative acknowledgement of receipt (NACK) and presence of the CBG based HARQ-ACK information", it means that the TB is received but demodulated incorrectly, and the TB has CBG based HARQ-ACK information; when its the corresponding feedback state is "negative acknowledgement of receipt (NACK) and absence of the CBG based HARQ-ACK information", it means that the TB is received but demodulated incorrectly, and the TB does not have the CBG based HARQ-ACK information; and when its corresponding feedback state is "no data received", it means that the TB is not received. There may be two cases when the TB is not received: 1) the second device sent the TB but the first device missed the detection of the TB; 2) the second device did not send the TB, so the first device did not receive the TB.

Exemplarily, the HARQ-ACK information being "11" indicates acknowledgement of receipt (ACK), the HARQ-ACK information being "01" indicates negative acknowledgement of receipt (NACK) and presence of the CBG based HARQ-ACK information, the HARQ-ACK information being "10" indicates negative acknowledgement of receipt (NACK) and absence of the CBG based HARQ-ACK information, and the HARQ-ACK information being "00" indicates no data received.

In an example, it is assumed that the first part includes m pieces of TB based HARQ-ACK information, with m being a positive integer.

When the number of unsuccessfully received TBs corresponding to the m pieces of TB based HARQ-ACK information is k and k is less than or equal to n, the second part includes the CBG based HARQ-ACK information of the k unsuccessfully received TBs. In addition, if k is less than n, the position in the second part that is not occupied by the CBG based HARQ-ACK information of the k unsuccessfully received TBs is supplemented with a preset value, which may be "1" or "0", without any limitation in this embodiment of the present disclosure. The feedback state indicated by the HARQ-ACK information corresponding to the k unsuccessfully received TBs is: negative acknowledgement of receipt and presence of the CBG based HARQ-ACK information, and k is a positive integer.

When the number of unsuccessfully received TBs corresponding to the m pieces of TB based HARQ-ACK information is k and k is greater than n, the second part includes the CBG based HARQ-ACK information of n unsuccessfully received TBs selected from the k unsuccessfully received TBs. The feedback state indicated by the HARQ-ACK information corresponding to the n unsuccessfully received TBs is: negative acknowledgement of receipt and presence of the CBG based HARQ-ACK information, and the feedback state indicated by the HARQ-ACK information corresponding to unselected TBs among the k unsuccessfully received TBs is: negative acknowledgement of receipt and absence of the CBG based HARQ-ACK information, or no data received, and k is a positive integer.

The above unsuccessfully received TBs include a TB that is received but demodulated incorrectly, and a TB that is not received.

Taking the dynamic codebook feedback mode as an example, the base station schedules 15 PDSCHs, and the HARQ-ACK information corresponding to these 15 PDSCHs is multiplexed into an HARQ-ACK codebook, each PDSCH corresponds to 1 TB, and the base station configures λ=10% and the number of CBGs contained in each TB being 4, i.e., b=4, for the terminal via high-level signaling (e.g., RRC signaling). Each TB corresponds to 2 bits of HARQ-ACK information, where the HARQ-ACK information being "11" indicates acknowledgement of receipt (ACK), the HARQ-ACK information being "01" indicates negative acknowledgement of receipt (NACK) and presence of CBG based HARQ-ACK information, the HARQ-ACK information being "10" indicates negative acknowledgement of receipt (NACK) and absence of CBG based HARQ-ACK information, and the HARQ-ACK information being "00" indicates no data received. The base station calculates the number of bits of the HARQ-ACK codebook according to Equation (2), i.e., s=15×2+⌊10%×15⌋×4=34, where the first 30 bits are the TB based HARQ-ACK information corresponding to 15 TBs, and the last 4 bits are the CBG based HARQ-ACK information for a particular TB, i.e., 1 TB can perform CBG based HARQ-ACK feedback.

In an example, it is assumed that for the above 15 TBs, the results of terminal demodulation are shown in Table 9 below.

TABLE 9

| TB1 | TB2 | TB3 | TB4 | TB5 | TB6 | TB7 | TB8 | TB9 | TB10 | TB11 | TB12 | TB13 | TB14 | TB15 |
|---|---|---|---|---|---|---|---|---|---|---|---|---|---|---|
| ACK | ACK | NACK | ACK | ACK | ACK | ACK | ACK | NACK | ACK | ACK | ACK | ACK | ACK | ACK |

As can be seen from Table 9 above, there are 2 TBs (i.e., TB3 and TB9) with the demodulation result of NACK. Since the number of TBs configured by the base station for CBG based feedback is 1, the terminal can feed back CBG based HARQ-ACK information for one of the 2 TBs with the demodulation result of NACK. The terminal can select any one of the above 2 TBs with the demodulation result of NACK for CBG based feedback. The selection performed by the terminal can be performed according to a preset algorithm, such as selecting the top one, or randomly selecting one, or using other preset algorithms for selection, which are not limited by the embodiments of the present disclosure. It is assumed that the terminal chooses to feed back the CBG based HARQ-ACK information for TB9, but does not feed back the CBG based HARQ-ACK information for TB3. If among the four CBGs (CBG0-CBG3) contained in TB9, CBG0 is demodulated incorrectly and the other CBGs are demodulated correctly, the HARQ-ACK codebook fed by the terminal is shown in Table 10 below.

TABLE 10

| First part | | | | | | | | | | | | | | | Second part CBG based feedback |
|---|---|---|---|---|---|---|---|---|---|---|---|---|---|---|---|
| TB1 | TB2 | TB3 | TB4 | TB5 | TB6 | TB7 | TB8 | TB9 | TB10 | TB11 | TB12 | TB13 | TB14 | TB15 | |
| 11 | 11 | 10 | 11 | 11 | 11 | 11 | 11 | 01 | 11 | 11 | 11 | 11 | 11 | 11 | 0111 |

When the number of TBs with the demodulation result of NACK is larger than the number of TBs allowed for CBG based feedback and configured by the base station, the terminal can independently select the TBs for CBG based feedback. In order to improve the transmission efficiency, the terminal may try to select the TB with fewer demodulation error CBGs for CBG based feedback. For instance, in this example, among the 4 CBGs (CBG0-CBG3) contained in TB9, CBG0 is demodulated incorrectly and the other CBGs are demodulated correctly, while among the 4 CBGs contained in TB3, 2 CBGs are demodulated incorrectly and 2 CBGs are demodulated correctly. It is clear that the CBG based feedback for TB3, compared to TB based feedback, can save 2 CBG transmission resources during retransmission, however, the CBG based feedback for TB9 can saves 3 CBG transmission resources.

In another example, it is assumed that for the above 15 TBs, the results of terminal demodulation are shown in Table 11 below.

TABLE 11

| TB1 | TB2 | TB3 | TB4 | TB5 | TB6 | TB7 | TB8 | TB9 | TB10 | TB11 | TB12 | TB13 | TB14 | TB15 |
|---|---|---|---|---|---|---|---|---|---|---|---|---|---|---|
| ACK | ACK | NACK | ACK | ACK | ACK | ACK | ACK | ACK | NACK | ACK | ACK | ACK | ACK | ACK |

The above TB3 is a TB that is demodulated incorrectly, and TB10 is a TB that is missed detection (e.g., the terminal finds that the TB10 is not detected through the counter, so it feeds back NACK for the TB10). It is still assumed that the number of TBs configured by the base station for CBG based feedback is 1, then the terminal can select the TB with demodulation error (i.e., TB3) for CBG based feedback, but does not perform CBG based feedback for the missed TB (i.e., TB10). It is assumed that among the 4 CBGs contained in TB3, 2 CBGs (CBG0 and CBG2) are demodulated incorrectly and the other 2 CBGs are demodulated correctly, the HARQ-ACK codebook fed back by the terminal is shown in Table 12 below.

TABLE 12

| | First part | | | | | | | | | | | | | | | Second part CBG based feedback |
|---|---|---|---|---|---|---|---|---|---|---|---|---|---|---|---|---|
| TB1 | TB2 | TB3 | TB4 | TB5 | TB6 | TB7 | TB8 | TB9 | TB10 | TB11 | TB12 | TB13 | TB14 | TB15 | | |
| 11 | 11 | 01 | 11 | 11 | 11 | 11 | 11 | 11 | 00 | 11 | 11 | 11 | 11 | 11 | | 0101 |

When there are both TB that is demodulated incorrectly and TB that is missed detection, the terminal may prefer to select the TB that is demodulated incorrectly for CBG based feedback, because for the TB missed detection, even if CBG based feedback is performed, the base station will retransmit the entire TB. Thus, CBG based feedback is preferred for the TB demodulated incorrectly, which can help to improve transmission efficiency.

In another example, it is assumed that for the above 15 TBs, the results of terminal demodulation are shown in Table 13 below.

TABLE 13

| TB1 | TB2 | TB3 | TB4 | TB5 | TB6 | TB7 | TB8 | TB9 | TB10 | TB11 | TB12 | TB13 | TB14 | TB15 |
|---|---|---|---|---|---|---|---|---|---|---|---|---|---|---|
| ACK | ACK | ACK | ACK | ACK | ACK | ACK | ACK | ACK | ACK | ACK | ACK | ACK | ACK | ACK |

As can be seen from Table 13 above, the demodulation results of all TBs are ACK. Since there is 1 TB configured by the base station for CBG based feedback, the terminal may set all 4 bits of the CBG based feedback bit to "1". Accordingly, the HARQ-ACK codebook fed back by the terminal is shown in Table 14 below.

TABLE 14

| | First part | | | | | | | | | | | | | | | Second part CBG based feedback |
|---|---|---|---|---|---|---|---|---|---|---|---|---|---|---|---|---|
| TB1 | TB2 | TB3 | TB4 | TB5 | TB6 | TB7 | TB8 | TB9 | TB10 | TB11 | TB12 | TB13 | TB14 | TB15 | | |
| 11 | 11 | 11 | 11 | 11 | 11 | 11 | 11 | 11 | 11 | 11 | 11 | 11 | 11 | 11 | | 1111 |

In another example, if the base station calculates the number of bits of the HARQ-ACK codebook according to Equation (1), i.e., $s = 15 \times 2 + \lceil 10\% \times \lceil 15 \rceil \rceil \times 4 = 38$, where the first 30 bits are the TB based HARQ-ACK information corresponding to 15 TBs and the last 8 bits are the CBG based HARQ-ACK information for 2 particular TBs, i.e., the CBG based HARQ-ACK feedback may be performed for 2 TBs.

It is assumed that for the above 15 TBs, the results of terminal demodulations are shown in Table 15 below.

TABLE 15

| TB1 | TB2 | TB3 | TB4 | TB5 | TB6 | TB7 | TB8 | TB9 | TB10 | TB11 | TB12 | TB13 | TB14 | TB15 |
|---|---|---|---|---|---|---|---|---|---|---|---|---|---|---|
| ACK | ACK | ACK | ACK | ACK | NACK | ACK | ACK | ACK | ACK | ACK | ACK | ACK | ACK | ACK |

As can be seen from Table 15 above, there is 1 TB (i.e., TB6) with the demodulation result of NACK. Since there are two TBs configured by the base station for CBG based feedback, the terminal feeds back the CBG based HARQ-ACK information (which occupies 4 bits) of TB6 in the second part, and sets all of the remaining 4 bits to "1". It is assumed that among 4 CBGs (CBG0-CBG3) contained in TB6, CBG3 is demodulated incorrectly and the other CBGs are demodulated correctly, and the HARQ-ACK codebook fed by the terminal is shown in Table 16 below.

TABLE 16

| | First part | | | | | | | | | | | | | | | Second part CBG based feedback |
|---|---|---|---|---|---|---|---|---|---|---|---|---|---|---|---|---|
| TB1 | TB2 | TB3 | TB4 | TB5 | TB6 | TB7 | TB8 | TB9 | TB10 | TB11 | TB12 | TB13 | TB14 | TB15 | | |
| 11 | 11 | 11 | 11 | 11 | 01 | 11 | 11 | 11 | 11 | 11 | 11 | 11 | 11 | 11 | | 1110 1111 |

Taking the semi-static codebook feedback mode as an example, the base station configures a feedback window with 16 valid PDSCH positions, which can be interpreted as corresponding to 16 pieces of TB based HARQ-ACK information. The base station configures $\lambda=10\%$ and the number of CBGs contained in each TB being 4, i.e., b=4, for the terminal via high-level signaling (e.g., RRC signaling). Each TB corresponds to 2 bits of HARQ-ACK information. The number of TBs requiring CBG based feedback in a semi-static codebook is $n=\lceil \lambda \times m \rceil = \lceil 10\% \times 16 \rceil = 1$. It is assumed that the base station actually schedules 10 PDSCHs among the 16 PDSCH valid positions. Then, the terminal will feed back NACK for all the PDSCHs that are not scheduled, and for the 10 PDSCHs that are actually scheduled, the terminal will provide feedback according to the actual demodulation. It is assumed that the TB based feedback determined by the terminal is as shown in Table 17 below.

TABLE 17

| TB1 | TB2 | TB3 | TB4 | TB5 | TB6 | TB7 | TB8 | TB9 | TB10 | TB11 | TB12 | TB13 | TB14 | TB15 | TB16 |
|---|---|---|---|---|---|---|---|---|---|---|---|---|---|---|---|
| NACK | NACK | NACK | NACK | NACK | NACK | ACK | ACK | ACK | ACK | NACK | ACK | ACK | ACK | ACK | ACK |

In this case, TB1-TB6 are not actually sent by the base station (but the terminal cannot distinguish whether the base station actually sends them), so the terminal feeds back NACK for TB1-TB6. TB7-TB16 are the data actually sent by the base station, where TB11 is demodulated incorrectly (e.g., CBG1 is demodulated incorrectly and other CBG is demodulated correctly) and other TBs are demodulated correctly, then the terminal feeds back NACK for TB11, and feeds back ACK for TB7-TB10 and TB12-TB16. Correspondingly, the HARQ-ACK codebook fed back by the terminal is shown in Table 18 below.

TABLE 18

| | First part | | | | | | | | | | | | | | | Second part CBG based feedback |
|---|---|---|---|---|---|---|---|---|---|---|---|---|---|---|---|---|
| TB1 | TB2 | TB3 | TB4 | TB5 | TB6 | TB7 | TB8 | TB9 | TB10 | TB11 | TB12 | TB13 | TB14 | TB15 | TB16 | |
| 00 | 00 | 00 | 00 | 00 | 00 | 11 | 11 | 11 | 11 | 01 | 11 | 11 | 11 | 11 | 11 | 0100 |

When there are both TB demodulated incorrectly and TB that cannot be determined whether it is not actually sent or not detected, the terminal may prefer to select the TB that is demodulated incorrectly for CBG based feedback, because for the TB that is not actually sent or not detected, even if CBG based feedback is performed, the base station may not have to retransmit or may retransmit the entire TB. Thus, CBG based feedback is preferred for the TB demodulated incorrectly, which can help to improve transmission efficiency.

Optionally, when the number of unsuccessfully received TBs corresponding to the m pieces of TB based HARQ-ACK information is k and k is greater than n, that is, when there are some TBs to be selected from k unsuccessfully received TBs for CBG based feedback, among those k unsuccessfully received TBs, the selection priority of the first TB is higher than the selection priority of the second TB, where the number of CBGs demodulated incorrectly and contained in the first TB is smaller than the number of CBGs demodulated incorrectly and contained in the second TB; and/or, among those k unsuccessfully received TBs, the selection priority of the third TB is higher than the selection priority of the fourth TB, where the third TB is a TB received but demodulated incorrectly and the fourth is a TB not received.

The selection priority of the TB as described above is the priority degree of selecting the TB for CBG based feedback. When the selection priority of the first TB is higher than the selection priority of the second TB, the first TB is preferentially selected for CBG based feedback. Similarly, when the selection priority of the third TB is higher than the selection priority of the fourth TB, the third TB is preferentially selected for CBG based feedback.

In the above method, CBG based feedback is preferred for a TB having fewer CBGs demodulated incorrectly, and preferred for the TB that is received but demodulated incorrectly, which helps to improve transmission efficiency and save transmission resources during retransmission.

It should be noted that in the above embodiment, the technical solutions of the present disclosure are mainly introduced and explained in the downlink transmission scenario. For the uplink transmission scenario or any other data transmission scenario that requires HARQ feedback, the technical solutions provided by this disclosure can be adopted for HARQ-ACK codebook feedback, which will not be exemplified by the embodiments of the present disclosure.

It should also be noted that in the above embodiments, when each TB corresponds to 2 bits of HARQ-ACK information, four different feedback states are indicated as an example for description. In practical applications, when the HARQ-ACK information corresponding to each TB is 2 bits, 3 feedback states may be indicated or even less, such as including the above feedback states (1), (2) and (3), which are not limited by the embodiments of the present disclosure.

In summary, in the technical solutions provided by the present disclosure, the size of the HARQ-ACK codebook can be effectively reduced by including the TB based HARQ-ACK information and CBG based HARQ-ACK information in the HARQ-ACK codebook, compared to the adoption of CBG based feedback alone. In addition, since the number of bits of the CBG based HARQ-ACK information is determined in advance, the receiver of the HARQ-ACK codebook can know the number of bits of the HARQ-ACK codebook in advance before demodulating the HARQ-ACK codebook, thus ensuring the accurate demodulation of the HARQ-ACK information, and improving the data transmission performance between devices.

In addition, by designing the HARQ-ACK information corresponding to each TB to be 2 bits, the feedback states indicated by the TB based HARQ-ACK information can be more detailed, thus enabling the data sender to be more accurately informed of the TB and/or CBG to be retransmitted and to perform data retransmission more precisely, which helps to improve transmission efficiency and save transmission resources during retransmission.

FIG. 3 is a flow chart showing a method of receiving an HARQ-ACK codebook in accordance with an embodiment. The method can be applied in the network architecture shown in FIG. 1, and may include the following steps.

At step 301, a second device receives an HARQ-ACK codebook sent by a first device.

Here, the HARQ-ACK codebook includes a first part and a second part. The first part includes TB based HARQ-ACK information, and the second part includes CBG based HARQ-ACK information of n TBs. The number of bits in the second part is determined in advance, and n is a positive integer.

The description of the HARQ-ACK codebook can be found in the above examples, which will not be repeated in this embodiment.

After receiving the HARQ-ACK codebook from the first device, the second device may demodulate the HARQ-ACK codebook, read the HARQ-ACK information carried in the HARQ-ACK codebook, and thus determine the TB and/or CBG to be retransmitted, and then perform the retransmission.

In some embodiments, when the first part includes 1-bit TB based HARQ-ACK information, there may be several scenarios included as follows.

(1) The second device obtains the HARQ-ACK information corresponding to a target TB included in the first part. If the feedback state indicated by the HARQ-ACK information corresponding to the target TB is NACK, when the dynamic codebook feedback mode is used, the second device further determines whether the CBG based HARQ-ACK information corresponding to the target TB is included in the second part. If the second part includes the CBG based HARQ-ACK information corresponding to the target TB, the second device determines the CBG(s) to be retransmitted in the target TB based on the CBG based HARQ-ACK information corresponding to the target TB, and sends the CBG to be retransmitted in the target TB to the first device. If the second part does not include the CBG based HARQ-ACK information corresponding to the target TB, the second device retransmits the target TB to the first device.

Exemplarily, it is assumed that the HARQ-ACK codebook received by the base station is shown in Table 2 above. There are two TBs with feedback state of NACK in the first part, including TB3 and TB14, and the number of TBs that can perform CBG based feedback in the second part is 1. Since when the number of TBs with feedback state of NACK is greater than the number of TBs (i.e., n) that can perform CBG based feedback, the terminal selects the top-ranked n TBs for CBG based feedback, the base station determines that the terminal has performed CBG based feedback for TB3, then the base station can be informed that the CBG2 in TB3 is demodulated incorrectly, and the base station can retransmit the CBG2 in TB3 and TB14 to the terminal.

Exemplarily, it is assumed that the HARQ-ACK codebook received by the base station is as shown in Table 4 above. The base station can determine that the demodulations performed by the terminal for TB1-TB15 are correct and no retransmission is required.

Exemplarily, it is assumed that the HARQ-ACK codebook received by the base station is as shown in Table 6 above. The base station can be informed that there is an error in the demodulation of TB3 and it is the demodulation of CBG2 in the TB3 that is in error, so the base station retransmits the CBG2 in the TB3 to the terminal.

(2) The second device obtains the HARQ-ACK information corresponding to a target TB included in the first part. If the feedback state indicated by the HARQ-ACK information corresponding to the target TB is NACK, when the semi-static codebook feedback mode is used, the second device further determines whether the target TB is a TB that is actually sent. If the target TB is the TB that is actually sent, the second device retransmits the target TB to the first device. If the target TB is not a TB that is actually sent, the second device does not need to retransmit the target TB to the first device.

Exemplarily, it is assumed that the HARQ-ACK codebook received by the base station is as shown in Table 8 above. The base station can be informed that the terminal has not received or demodulated incorrectly TB1-TB6 and TB11. If the base station determines that TB1-TB6 have not actually been sent in conjunction with its own actual transmission situation, the base station retransmits TB11 to the terminal.

In some embodiments, when the first part includes 2-bit TB based HARQ-ACK information, there may be several scenarios included as follows.

(1) The second device obtains the HARQ-ACK information corresponding to a target TB included in the first part. If the feedback state indicated by the HARQ-ACK information corresponding to the target TB is negative acknowledgement of receipt and presence of the CBG based HARQ-ACK information, the second device obtains the CBG based HARQ-ACK information of the target TB from the second part. The second device determines the CBG(s) to be retransmitted in the target TB based on the CBG based HARQ-ACK information of the target TB, and sends the CBG(s) to be retransmitted in the target TB to the first device.

(2) The second device obtains the HARQ-ACK information corresponding to a target TB included in the first part. If the feedback state indicated by the HARQ-ACK information corresponding to the target TB is negative acknowledgement of receipt and absence of the CBG based HARQ-ACK information, the second device retransmits the target TB to the first device.

(3) The second device obtains the HARQ-ACK information corresponding to a target TB included in the first part. If the feedback state indicated by the HARQ-ACK information corresponding to the target TB is not data received, when the semi-static codebook feedback mode is used, the second device determines whether the target TB not received by the first device is a TB actually sent, and the second device retransmits the target TB to the first device in response to the target TB being the TB actually sent. Alternatively, if the feedback state indicated by the HARQ-ACK information corresponding to the target TB is not data received, when the dynamic codebook feedback mode is used, the second device determines that the first device misses the detection of the target TB and retransmits the target TB to the first device.

Exemplarily, it is assumed that the HARQ-ACK codebook received by the base station is as shown in Table 10 above. The base station can determine that the HARQ-ACK information fed back by the terminal for TB3 is NACK and absence of the CBG based HARQ-ACK information, and the HARQ-ACK information fed back by the terminal for TB9 is NACK and presence of the CBG based HARQ-ACK information. Based on the CBG based feedback information in the second part, the base station further determines that it is CBG0 that needs to be retransmitted in TB9. Then, the base station retransmits TB3 as well as CBG0 in TB9 to the terminal.

Exemplarily, if dynamic codebook feedback mode is used, it is assumed that the HARQ-ACK codebook received by the base station is as shown in Table 12 above. The base station can determine that the HARQ-ACK information fed back by the terminal for TB3 is NACK and presence of the CBG based HARQ-ACK information, and the HARQ-ACK information fed back by the terminal for TB10 is data missed detection. Based on the CBG based feedback information in the second part, the base station further determines that the CBGs to be retransmitted in TB3 are CBG0 and CBG2. Then, the base station retransmits TB10, and CBG0 and CBG2 in TB3 to the terminal.

Exemplarily, it is assumed that the HARQ-ACK codebook received by the base station is as shown in Table 14 above. The base station can determine that the demodulations performed by the terminal for TB1-TB15 are correct and no retransmission is required.

Exemplarily, it is assumed that the HARQ-ACK codebook received by the base station is as shown in Table 16 above. The base station can determine that the HARQ-ACK information fed back by the terminal for TB6 is NACK and presence of the CBG based HARQ-ACK information. Based on the CBG based HARQ-ACK information in the second part, the base station further determines that the CBG to be retransmitted in TB6 is CBG3. Then, the base station retransmits CBG3 in TB6 to the terminal.

Exemplarily, if the semi-static codebook feedback mode is used, it is assumed that the HARQ-ACK codebook received by the base station is shown in Table 18 above. The base station can determine that the HARQ-ACK information fed back by the terminal for TB1-TB6 is no data received, and the HARQ-ACK information fed back by the terminal for TB11 is NACK and presence of the CBG based HARQ-ACK information. Further, the base station takes into account its actual transmission situation. If the base station determines that TB1-TB6 are not actually sent, it needs to retransmit CBG1 in TB11 to the terminal. If the terminal determines that TB1-TB5 are not actually sent, but TB6 is actually sent, the base station needs to retransmit TB6 and CBG1 in TB11 to the terminal.

In summary, in the technical solutions provided by the present disclosure, the size of the HARQ-ACK codebook can be effectively reduced by including the TB based HARQ-ACK information and CBG based HARQ-ACK information in the HARQ-ACK codebook, compared to the adoption of CBG based feedback alone. In addition, since the number of bits of the CBG based HARQ-ACK information is determined in advance, the receiver of the HARQ-ACK codebook can know the number of bits of the HARQ-ACK codebook in advance before demodulating the HARQ-ACK codebook, thus ensuring the accurate demodulation of the HARQ-ACK information and improving the data transmission performance between devices.

The apparatus embodiments of the present disclosure can be used to perform the method embodiments of the present disclosure as described below. For details not disclosed in the apparatus embodiments of the present disclosure, please refer to the method embodiments of the present disclosure.

FIG. 4 is a block diagram showing an apparatus for sending an HARQ-ACK codebook in accordance with an embodiment. The apparatus has functions to implement the method embodiments on the first device side described above, and these functions can be implemented by hardware or by hardware executing the corresponding software. The apparatus 400 may include a codebook generation module 410 and a codebook sending module 420.

The codebook generation module 410 is configured to generate an HARQ-ACK codebook, where the HARQ-ACK codebook includes a first part and a second part, the first part includes TB based HARQ-ACK information, and the second part includes CBG based HARQ-ACK information of n TBs, the number of bits in the second part being determined in advance, n being a positive integer.

The codebook sending module 420 is configured to send the HARQ-ACK codebook to a second device.

Optionally, the number of bits in the second part is determined according to a parameter pre-configured by the second device or the first device; or the number of bits in the second part is pre-determined.

Optionally, n is an upward rounding of a product of a preset coefficient and the number of TBs, or n is a downward rounding of the product of the preset coefficient and the number of TBs. The number of TBs is an amount of TB based HARQ-ACK information for multiplexing the HARQ-ACK codebook.

Optionally, the preset coefficient is pre-configured by the second device or the first device, or the preset coefficient is pre-determined.

Optionally, each TB corresponds to two bits of HARQ-ACK information.

Optionally, a feedback state indicated by the HARQ-ACK information corresponding to each TB is any one of: acknowledgement of receipt; negative acknowledgement of receipt and presence of the CBG based HARQ-ACK information; negative acknowledgement of receipt and absence of the CBG based HARQ-ACK information; and no data received.

Optionally, the first part includes m pieces of TB based HARQ-ACK information, m being a positive integer; and the second part includes, in response to the number of unsuccessfully received TBs corresponding to the m pieces of TB based HARQ-ACK information being k and k being less than n, the CBG based HARQ-ACK information of the k unsuccessfully received TBs, and a position in the second part unoccupied by the CBG based HARQ-ACK information of the k unsuccessfully received TBs is supplemented with a preset value. A feedback state indicated by HARQ-ACK information corresponding to the k unsuccessfully received TBs is negative acknowledgement of receipt and presence of the CBG based HARQ-ACK information, and k is a positive integer.

Optionally, the first part includes m pieces of TB based HARQ-ACK information, m being a positive integer; and the second part includes, in response to the number of unsuccessfully received TBs corresponding to the m pieces of TB based HARQ-ACK information being k and k being greater than n, the CBG based HARQ-ACK information of n unsuccessfully received TBs selected from the k unsuccessfully received TBs. A feedback state indicated by HARQ-ACK information corresponding to the n unsuccessfully received TBs is negative acknowledgement of receipt and presence of the CBG based HARQ-ACK information; and a feedback state indicated by HARQ-ACK information corresponding to unselected TBs among the k unsuccessfully received TBs is negative acknowledgement of receipt and absence of the CBG based HARQ-ACK information, or no data received, k being a positive integer.

Optionally, among the k unsuccessfully received TBs, a selection priority of a first TB is higher than a selection priority of a second TB, the number of CGBs demodulated incorrectly and contained in the first TB being less than the number of CGBs demodulated incorrectly and contained in the second TB; and/or among the k unsuccessfully received TBs, a selection priority of a third TB is higher than a selection priority of a fourth TB, the third TB being a TB received but demodulated incorrectly, the fourth TB being a TB not received.

In summary, in the technical solutions provided by the present disclosure, the size of the HARQ-ACK codebook can be effectively reduced by including the TB based HARQ-ACK information and CBG based HARQ-ACK information in the HARQ-ACK codebook, compared to the adoption of CBG based feedback alone. In addition, since the number of bits of the CBG based HARQ-ACK information is determined in advance, the receiver of the HARQ-ACK codebook can know the number of bits of the HARQ-ACK codebook in advance before demodulating the HARQ-ACK codebook, thus ensuring the accurate demodulation of the HARQ-ACK information and improving the data transmission performance between devices.

FIG. 5 is a block diagram showing an apparatus for receiving an HARQ-ACK codebook in accordance with an embodiment. The apparatus has functions to implement the method embodiments on the second device side described above, and these functions can be implemented by hardware or by hardware executing the corresponding software. The apparatus 500 may include a codebook receiving module 510.

The codebook receiving module 510 is configured to receive an HARQ-ACK codebook sent by a first device, where the HARQ-ACK codebook includes a first part and a second part, the first part includes TB based HARQ-ACK information, and the second part includes CBG based HARQ-ACK information of n TBs. The number of bits in the second part is determined in advance, and n is a positive integer.

Optionally, as shown in FIG. 5, the apparatus 500 further includes a first information obtaining module 520, a second information obtaining module 530, a retransmission determination module 540, and a data retransmission module 550.

The first information obtaining module 520 is configured to obtain HARQ-ACK information corresponding to a target TB from the first part.

The second information obtaining module 530 is configured to obtain, in response to a feedback state indicated by the HARQ-ACK information corresponding to the target TB being negative acknowledgement of receipt and presence of the CBG based HARQ-ACK information, CBG based HARQ-ACK information of the target TB from the second part.

The retransmission determination module 540 is configured to determine a CBG to be retransmitted in the target TB based on the CBG based HARQ-ACK information of the target TB.

The data retransmission module 550 is configured to send the CBG to be retransmitted in the target TB to the first device.

Optionally, as shown in FIG. 5, the apparatus 500 further includes a first information obtaining module 520 and a data retransmission module 550.

The first information obtaining module 520 is configured to obtain HARQ-ACK information corresponding to a target TB from the first part.

The data retransmission module 550 is configured to retransmit, in response to a feedback state indicated by the HARQ-ACK information corresponding to the target TB being negative acknowledgement of receipt and absence of the CBG based HARQ-ACK information, the target TB to the first device.

Optionally, as shown in FIG. 5, the apparatus 500 further includes a first information obtaining module 520 and a data retransmission module 550.

The first information obtaining module 520 is configured to obtain HARQ-ACK information corresponding to a target TB from the first part.

The data retransmission module 550 is configured to determine, in response to a feedback state indicated by the HARQ-ACK information corresponding to the target TB being no data received and using a semi-static codebook feedback mode, whether the target TB is a TB actually sent, and retransmit the target TB to the first device in response to the target TB being the TB actually sent.

The data retransmission module 550 is further configured to determine, in response to the feedback state indicated by the HARQ-ACK information corresponding to the target TB being no data received and using a dynamic codebook feedback mode, that the first device misses a detection of the target TB, and retransmit the target TB to the first device.

In summary, in the technical solutions provided by the present disclosure, the size of the HARQ-ACK codebook can be effectively reduced by including the TB based HARQ-ACK information and CBG based HARQ-ACK information in the HARQ-ACK codebook, compared to the adoption of CBG based feedback alone. In addition, since the number of bits of the CBG based HARQ-ACK information is determined in advance, the receiver of the HARQ-ACK codebook can know the number of bits of the HARQ-ACK codebook in advance before demodulating the HARQ-ACK codebook, thus ensuring the accurate demodulation of the HARQ-ACK information and improving the data transmission performance between devices.

It should be noted that the apparatuses provided in the above embodiments are only illustrated by the division of the above-mentioned functional modules in realizing their functions. In practical applications, the above functions can be allocated by different functional modules according to actual needs. The content structures of the apparatuses are divided into different functional modules to complete all or part of the functions described above.

Regarding the apparatuses in the above-mentioned embodiments, the specific manner in which each module performs the operation has been described in detail in the method embodiments, and will not be described in detail here.

An embodiment of the present disclosure also provides a device for sending an HARQ-ACK codebook, which can implement the method on the first device side provided by the embodiments of the present disclosure. The device for sending the HARQ-ACK codebook may be the first device, or may be provided in the first device. The device for sending the HARQ-ACK codebook may include a processor, and a memory for storing executable instructions of the processor. The processor is configured to: generate an HARQ-ACK codebook, where the HARQ-ACK codebook includes a first part and a second part, the first part includes TB based HARQ-ACK information, and the second part includes CBG based HARQ-ACK information of n TBs, the number of bits in the second part being determined in advance, n being a positive integer; and send the HARQ-ACK codebook to a second device.

Optionally, the number of bits in the second part is determined according to a parameter pre-configured by the second device or the first device; or the number of bits in the second part is pre-determined.

Optionally, n is an upward rounding of a product of a preset coefficient and the number of TBs, or n is a downward rounding of the product of the preset coefficient and the number of TBs. The number of TBs is an amount of TB based HARQ-ACK information for multiplexing the HARQ-ACK codebook.

Optionally, the preset coefficient is pre-configured by the second device or the first device, or the preset coefficient is pre-determined.

Optionally, each TB corresponds to two bits of HARQ-ACK information.

Optionally, a feedback state indicated by the HARQ-ACK information corresponding to each TB is any one of: acknowledgement of receipt; negative acknowledgement of receipt and presence of the CBG based HARQ-ACK information; negative acknowledgement of receipt and absence of the CBG based HARQ-ACK information; and no data received.

Optionally, the first part includes m pieces of TB based HARQ-ACK information, m being a positive integer; and the second part includes, in response to the number of unsuccessfully received TBs corresponding to the m pieces of TB based HARQ-ACK information being k and k being less than n, the CBG based HARQ-ACK information of the k unsuccessfully received TBs, and a position in the second part unoccupied by the CBG based HARQ-ACK information of the k unsuccessfully received TBs is supplemented with a preset value. A feedback state indicated by HARQ-ACK information corresponding to the k unsuccessfully received TBs is negative acknowledgement of receipt and presence of the CBG based HARQ-ACK information, and k is a positive integer.

Optionally, the first part includes m pieces of TB based HARQ-ACK information, m being a positive integer; and the second part includes, in response to the number of unsuccessfully received TBs corresponding to the m pieces of TB based HARQ-ACK information being k and k being greater than n, the CBG based HARQ-ACK information of n unsuccessfully received TBs selected from the k unsuccessfully received TBs. A feedback state indicated by HARQ-ACK information corresponding to the n unsuccessfully received TBs is negative acknowledgement of receipt and presence of the CBG based HARQ-ACK information; and a feedback state indicated by HARQ-ACK information corresponding to unselected TBs among the k unsuccessfully received TBs is negative acknowledgement of receipt and absence of the CBG based HARQ-ACK information, or no data received, k being a positive integer.

Optionally, among the k unsuccessfully received TBs, a selection priority of a first TB is higher than a selection priority of a second TB, the number of CGBs demodulated incorrectly and contained in the first TB being less than the number of CGBs demodulated incorrectly and contained in the second TB; and/or among the k unsuccessfully received TBs, a selection priority of a third TB is higher than a selection priority of a fourth TB, the third TB being a TB received but demodulated incorrectly, the fourth TB being a TB not received.

An embodiment of the present disclosure also provides a device for receiving an HARQ-ACK codebook, which can implement the method on the second device provided by the embodiments of the present disclosure. The device for receiving the HARQ-ACK codebook may be the second device, or may be provided in the second device. The device for receiving the HARQ-ACK codebook may include a processor, and a memory for storing executable instructions of the processor. The processor is configured to receive an HARQ-ACK codebook sent by a first device, where the HARQ-ACK codebook includes a first part and a second part, the first part includes TB based HARQ-ACK information, and the second part includes CBG based HARQ-ACK information of n TBs. The number of bits in the second part is determined in advance, and n is a positive integer.

Optionally, the processor is further configured to obtain HARQ-ACK information corresponding to a target TB from the first part; obtain, in response to a feedback state indicated by the HARQ-ACK information corresponding to the target TB being negative acknowledgement of receipt and presence of the CBG based HARQ-ACK information, CBG based HARQ-ACK information of the target TB from the second part; determine a CBG to be retransmitted in the target TB based on the CBG based HARQ-ACK information of the target TB; and send the CBG to be retransmitted in the target TB to the first device.

Optionally, the processor is further configured to obtain HARQ-ACK information corresponding to a target TB from the first part; and retransmit, in response to a feedback state indicated by the HARQ-ACK information corresponding to the target TB being negative acknowledgement of receipt and absence of the CBG based HARQ-ACK information, the target TB to the first device.

Optionally, the processor is further configured to obtain HARQ-ACK information corresponding to a target TB from the first part; and determine, in response to a feedback state indicated by the HARQ-ACK information corresponding to the target TB being no data received and using a semi-static codebook feedback mode, whether the target TB is a TB actually sent, and retransmit the target TB to the first device in response to the target TB being the TB actually sent, or determine, in response to the feedback state indicated by the HARQ-ACK information corresponding to the target TB being no data received and using a dynamic codebook feedback mode, that the first device misses a detection of the target TB, and retransmit the target TB to the first device.

FIG. 6 is a structural block diagram showing a terminal in accordance with an embodiment.

The terminal 600 includes a transmitter 601, a receiver 602, and a processor 603. The processor 603 may also be a controller, indicated as "controller/processor 603" in FIG. 6. Optionally, the terminal 600 may further include a modem processor 605, where the modem processor 605 may include an encoder 606, a modulator 607, a decoder 608, and a demodulator 609.

In one example, the transmitter 601 modulates (e.g., analog converts, filters, amplifies, up converts, etc.) the output samples and generates an uplink signal that is transmitted via the antenna to the access network device described in the above embodiments. On the downlink, the antenna receives the downlink signal transmitted by the access network equipment in the above embodiments. The receiver 602 modulates (e.g., filters, amplifies, down converts, and digitizes, etc.) the signal received from the antenna and provides input samples. In the modem processor 605, the encoder 606 receives the service data and signaling messages to be sent on the uplink and processes (e.g., formats, encodes, and interleaves) the service data and signaling messages. The modulator 607 further processes (e.g., symbol mapping and modulation) the encoded service data and signaling messages and provides output samples. The demodulator 609 processes (e.g., demodulates) the input samples and provides symbol estimation. The decoder 608 processes (e.g., deinterleaves and decodes) the symbol estimation and provides the decoded data and signaling messages sent to terminal 600. The encoder 606, modulator 607, demodulator 609, and decoder 608 may be implemented by the synthetic modem processor 605. These elements are processed according to the wireless access technology used in the wireless access network (e.g., access technology for LTE and other evolved systems). It is noted that when the terminal 600 does not include the modem processor 605, the above functions of the modem processor 605 may also be performed by the processor 603.

The processor 603 controls and manages the actions of the terminal 600 for performing the processing performed by the terminal 600 in the embodiments of the present disclosure described above. For example, the processor 603 is also used to perform the various steps on the terminal side of the method embodiments described above, and/or other steps of the technical solutions described in the embodiments of the present disclosure.

Further, the terminal 600 may also include a memory 604, the memory 604 stores program code and data for use in the terminal 600.

It should be understood that FIG. 6 illustrates only a simplified design of the terminal 600. In practical applications, terminal 600 may contain any number of transmitters, receivers, processors, modem processors, memories, etc., and all terminals that can implement embodiments of the present disclosure are within the scope of protection of embodiments of the present disclosure.

Figure 7:
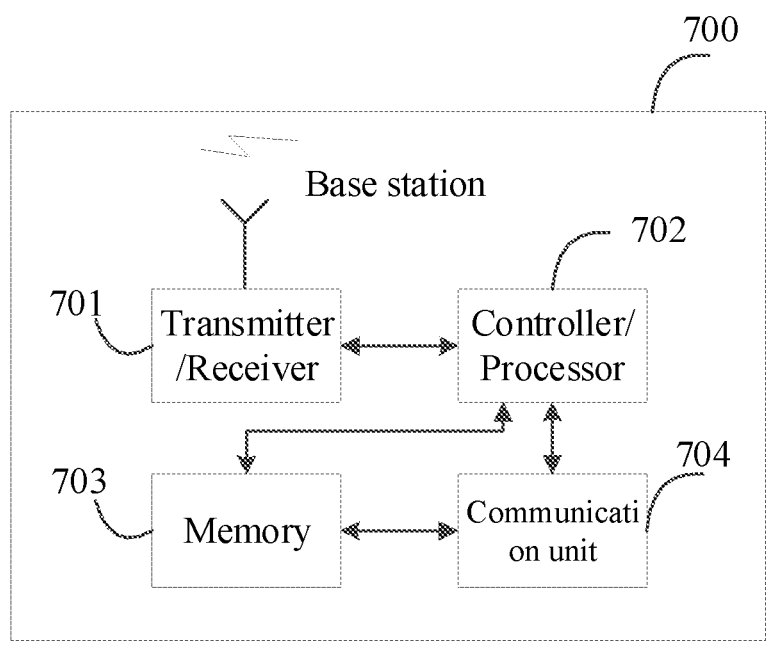
FIG. 7 is a structural block diagram showing a base station in accordance with an embodiment.

FIG. 7 is a structural block diagram showing a base station in accordance with an embodiment.

The base station 700 includes a transmitter/receiver 701 and a processor 702. The processor 702 may also be a controller, indicated as "controller/processor 702" in FIG. 7. The transmitter/receiver 701 supports the sending and receiving of information between the base station and the terminal (e.g., UE) in the above embodiments and the communication between the base station and other network entities. The processor 702 performs various functions for communicating with the UE. On the uplink, the uplink signal from the UE is received via the antenna, demodulated by the receiver 701 (e.g. demodulation of the high frequency signal into a baseband signal) and further processed by the processor 702 to recover the service data and signaling messages sent by the UE. On the downlink, the service data and signaling messages are processed by processor 702 and modulated by transmitter 701 (e.g., modulation of the baseband signal into a high frequency signal) to generate the downlink signal and transmit it to the UE via the antenna. It should be noted that the above mentioned functions of demodulation or modulation can also be performed by processor 702. For example, the processor 702 is also used to perform the various steps on the base station side of the method embodiments described above, and/or other steps of the technical solutions described in embodiments of the present disclosure.

Further, the base station 700 may also include a memory 703, which stores the program code and data of the base station 700. Moreover, the base station 700 may include a communication unit 704. The communication unit 704 supports communication of the base station 700 with other network entities, such as network devices in the core network, etc. For example, in a 5G NR system, the communication unit 704 may be a NG-U interface for supporting the base station 700 to communicate with a User Plane Function (UPF) entity, or, the communication unit 704 may be an NG-C interface for supporting the base station 700 to communicate with an Access and Mobility Management Function (AMF) entity for communication.

It should be understood that FIG. 7 illustrates only a simplified design of the base station 700. In practical applications, the base station 700 may contain any number of transmitters, receivers, processors, controllers, memories, communication units, etc., and all base stations that can implement embodiments of the present disclosure are within the scope of protection of embodiments of the present disclosure.

Embodiments of the present disclosure also provide a non-transitory computer readable storage medium on which a computer program is stored. The computer program, when executed by a processor of the first device, implements the method for sending an HARQ-ACK codebook as described above.

Embodiments of the present disclosure also provide a non-transitory computer readable storage medium on which a computer program is stored. The computer program, when executed by a processor of the second device, implements the method for receiving an HARQ-ACK codebook as described above.

It should be understood that the term "a plurality of/multiple" in the present disclosure refers to two or more. The term "and/or" describes the relationship of the associated objects and indicates that there can be three kinds of relationships, for example, A and/or B, which can mean that A exists alone, both A and B exist, and B exists alone. The character "/" generally indicates an "or" relationship between the associated objects before and after the character.

Other embodiments of the present disclosure will readily be anticipated by those skilled in the art upon consideration of the specification and practice of the disclosure herein. This application is intended to cover any variations, uses, or adaptations of the present disclosure that follow the general principles of this application and include common knowledge or techniques in the technical field not disclosed by the present disclosure. The specification and examples are to be regarded as exemplary only, and the true scope and spirit of the disclosure being indicated by the following claims.

It should to be understood that this application is not limited to the precise structure already described above and illustrated in the accompanying drawings, and that various modifications and changes may be made without departing from its scope. The scope of this application is limited only by the appended claims.

What is claimed is:

1. A method for sending a Hybrid Automatic Repeat reQuest-Acknowledge (HARQ-ACK) codebook, comprising:
    generating, by a first device, an HARQ-ACK codebook, wherein the HARQ-ACK codebook comprises a first part and a second part, the first part comprises transmission block (TB) based HARQ-ACK information, and the second part comprises Code Block Group (CBG) based HARQ-ACK information of n TBs, wherein a number of bits in the second part is determined in advance, and n is a positive integer; and
    sending, by the first device, the HARQ-ACK codebook to a second device;
    wherein each TB corresponds to two bits of HARQ-ACK information;
    the first part comprises m pieces of TB based HARQ-ACK information, m being a positive integer; and
    the second part comprises, in response to determining that a number of unsuccessfully received TBs corresponding to the m pieces of TB based HARQ-ACK information is k and k is greater than n, the CBG based HARQ-ACK information of n unsuccessfully received TBs selected from the k unsuccessfully received TBs; and wherein
        a feedback state indicated by HARQ-ACK information corresponding to the n unsuccessfully received TBs is negative acknowledgement of receipt and presence of the CBG based HARQ-ACK information; and
        a feedback state indicated by HARQ-ACK information corresponding to unselected TBs among the k unsuccessfully received TBs is negative acknowledgement of receipt and absence of the CBG based HARQ-ACK information, or no data received, k being a positive integer.

2. The method of claim 1, wherein
    the number of bits in the second part is determined according to a parameter pre-configured by the second device or the first device; or
    the number of bits in the second part is pre-determined.

3. The method of claim 1, wherein
    n is an upward rounding of a product of a preset coefficient and the number of TBs, or
    n is a downward rounding of the product of the preset coefficient and the number of TBs; and wherein
    the number of TBs is an amount of TB based HARQ-ACK information for multiplexing the HARQ-ACK codebook; and
    the preset coefficient is pre-configured by the second device or the first device, or the preset coefficient is pre-determined.

4. The method of claim 1, wherein a feedback state indicated by the HARQ-ACK information corresponding to each TB is one of:
    acknowledgement of receipt;
    negative acknowledgement of receipt and presence of the CBG based HARQ-ACK information;
    negative acknowledgement of receipt and absence of the CBG based HARQ-ACK information; or
    no data received.

5. The method of claim 1, wherein:
    the first part comprises m pieces of TB based HARQ-ACK information, m being a positive integer; and
    the second part comprises, in response to determining that the number of unsuccessfully received TBs corresponding to the m pieces of TB based HARQ-ACK information is k and k is less than n, the CBG based HARQ-ACK information of the k unsuccessfully received TBs, and a position in the second part unoccupied by the CBG based HARQ-ACK information of the k unsuccessfully received TBs is supplemented with a preset value; and wherein
        a feedback state indicated by HARQ-ACK information corresponding to the k unsuccessfully received TBs is negative acknowledgement of receipt and presence of the CBG based HARQ-ACK information, k being a positive integer.

6. The method of claim 1, wherein
    among the k unsuccessfully received TBs, a selection priority of a first TB is higher than a selection priority of a second TB, the number of CGBs demodulated incorrectly and contained in the first TB being less than the number of CGBs demodulated incorrectly and contained in the second TB; and/or
    among the k unsuccessfully received TBs, a selection priority of a third TB is higher than a selection priority of a fourth TB, the third TB being a TB received but demodulated incorrectly, the fourth TB being a TB not received.

7. A method for receiving a Hybrid Automatic Repeat reQuest-Acknowledge (HARQ-ACK) codebook, comprising:
    receiving, by a second device, an HARQ-ACK codebook sent by a first device, wherein
    the HARQ-ACK codebook comprises a first part and a second part, the first part comprises transmission block (TB) based HARQ-ACK information, and the second part comprises Code Block Group (CBG) based HARQ-ACK information of n TBs, the number of bits in the second part is determined in advance, and n is a positive integer;
    wherein each TB corresponds to two bits of HARQ-ACK information;

the first part comprises m pieces of TB based HARQ-ACK information, m being a positive integer; and the second part comprises, in response to determining that a number of unsuccessfully received TBs corresponding to the m pieces of TB based HARQ-ACK information is k and k is greater than n, the CBG based HARQ-ACK information of n unsuccessfully received TBs selected from the k unsuccessfully received TBs; and wherein a feedback state indicated by HARQ-ACK information corresponding to the n unsuccessfully received TBs is negative acknowledgement of receipt and presence of the CBG based HARQ-ACK information; and a feedback state indicated by HARQ-ACK information corresponding to unselected TBs among the k unsuccessfully received TBs is negative acknowledgement of receipt and absence of the CBG based HARQ-ACK information, or no data received, k being a positive integer.

8. The method of claim 7, further comprising:

obtaining, by the second device, HARQ-ACK information corresponding to a target TB from the first part;

obtaining, by the second device, in response to determining that a feedback state indicated by the HARQ-ACK information corresponding to the target TB is negative acknowledgement of receipt and presence of the CBG based HARQ-ACK information, CBG based HARQ-ACK information of the target TB from the second part;

determining, by the second device, a CBG to be retransmitted in the target TB based on the CBG based HARQ-ACK information of the target TB; and sending, by the second device, the CBG to be retransmitted in the target TB to the first device.

9. The method of claim 7, further comprising:

obtaining, by the second device, HARQ-ACK information corresponding to a target TB from the first part; and retransmitting, by the second device, in response to determining that a feedback state indicated by the HARQ-ACK information corresponding to the target TB is negative acknowledgement of receipt and absence of the CBG based HARQ-ACK information, the target TB to the first device.

10. The method of claim 7, further comprising:

obtaining, by the second device, HARQ-ACK information corresponding to a target TB from the first part; and determining, by the second device, in response to determining that a feedback state indicated by the HARQ-ACK information corresponding to the target TB is no data received and is in a semi-static codebook feedback mode, whether the target TB is a TB actually sent, and retransmitting the target TB to the first device in response to the target TB being the TB actually sent, or determining, by the second device, in response to determining that the feedback state indicated by the HARQ-ACK information corresponding to the target TB is no data received and is in a dynamic codebook feedback mode, that the first device misses a detection of the target TB, and retransmitting the target TB to the first device.

11. A device for receiving a Hybrid Automatic Repeat reQuest-Acknowledge (HARQ-ACK) codebook, applied to a second device, comprising:

a processor, and a memory for storing one or more executable instructions of the processor;

wherein the processor is configured to perform the method as claimed in claim 7.

12. The device of claim 11, wherein the processor is further configured to:

obtain HARQ-ACK information corresponding to a target TB from the first part;

obtain, in response to determining that a feedback state indicated by the HARQ-ACK information corresponding to the target TB is negative acknowledgement of receipt and presence of the CBG based HARQ-ACK information, CBG based HARQ-ACK information of the target TB from the second part;

determine a CBG to be retransmitted in the target TB based on the CBG based HARQ-ACK information of the target TB; and send the CBG to be retransmitted in the target TB to the first device.

13. The device of claim 11, wherein the processor is further configured to:

obtain HARQ-ACK information corresponding to a target TB from the first part; and retransmit, in response to determining that a feedback state indicated by the HARQ-ACK information corresponding to the target TB is negative acknowledgement of receipt and absence of the CBG based HARQ-ACK information, the target TB to the first device.

14. The device of claim 11, wherein the processor is further configured to:

obtain HARQ-ACK information corresponding to a target TB from the first part; and determine, in response to determining that a feedback state indicated by the HARQ-ACK information corresponding to the target TB is no data received and is in a semi-static codebook feedback mode, whether the target TB is a TB actually sent, and retransmit the target TB to the first device in response to the target TB being the TB actually sent, or determine, in response to determining that the feedback state indicated by the HARQ-ACK information corresponding to the target TB is no data received and is in a dynamic codebook feedback mode, that the first device misses a detection of the target TB, and retransmit the target TB to the first device.

15. A device for sending a Hybrid Automatic Repeat reQuest-Acknowledge (HARQ-ACK) codebook, applied to a first device, comprising:

a processor, and a memory for storing one or more executable instructions of the processor;

wherein the processor is configured to:

generate an HARQ-ACK codebook, wherein the HARQ-ACK codebook comprises a first part and a second part, the first part comprises transmission block (TB) based HARQ-ACK information, and the second part comprises Code Block Group (CBG) based HARQ-ACK information of n TBs, wherein a number of bits in the second part is determined in advance, and n is a positive integer; and send the HARQ-ACK codebook to a second device;

wherein each TB corresponds to two bits of HARQ-ACK information;

the first part comprises m pieces of TB based HARQ-ACK information, m being a positive integer; and the second part comprises, in response to determining that a number of unsuccessfully received TBs corresponding to the m pieces of TB based HARQ-ACK information is k and k is greater than n, the CBG based HARQ-ACK information of n unsuccessfully received TBs selected from the k unsuccessfully received TBs; and wherein a feedback state indicated by HARQ-ACK information corresponding to the n unsuccessfully received TBs is negative acknowledgement of receipt and presence of the CBG based HARQ-ACK information; and a feedback state indicated by HARQ-ACK information corresponding to unselected TBs among the k unsuccessfully received TBs is negative acknowledgement of receipt and absence of the CBG based HARQ-ACK information, or no data received, k being a positive integer.

16. The device of claim 15, wherein the number of bits in the second part is determined according to a parameter pre-configured by the second device or the first device; or the number of bits in the second part is pre-determined.

17. The device of claim 15, wherein n is an upward rounding of a product of a preset coefficient and the number of TBs, or n is a downward rounding of the product of the preset coefficient and the number of TBs; and wherein the number of TBs is an amount of TB based HARQ-ACK information for multiplexing the HARQ-ACK codebook; and the preset coefficient is pre-configured by the second device or the first device, or the preset coefficient is pre-determined.

* * * * *